United States Patent

[11] 3,603,187

| [72] | Inventor | Walter Bredow<br>Ziegelmasch, Germany |
|---|---|---|
| [21] | Appl. No. | 832,373 |
| [22] | Filed | June 11, 1969 |
| [45] | Patented | Sept. 7, 1971 |
| [73] | Assignee | C. Behrens Aktiengesellschaft<br>Postfach, Germany |
| [32] | Priority | June 12, 1968 |
| [33] | | Germany |
| [31] | | P 17 52 546.1 |

[54] WORKPIECE CLAMPS FOR COORDINATE TABLES OF TURRET PUNCH
8 Claims, 14 Drawing Figs.

[52] U.S. Cl. .................................................. 83/62,
83/71, 83/409
[51] Int. Cl. ...................................................... B26d 7/06,
B26d 7/24

[50] Field of Search........................................... 83/62, 58,
71, 409, 410, 412; 72/1; 214/1.1, 1.4

[56] References Cited
UNITED STATES PATENTS
3,392,613  7/1968  Johns ............................  83/62
3,456,536  7/1969  Daniels..........................  83/62

Primary Examiner—James M. Meister
Attorney—Holman & Stern

ABSTRACT: A clamp holder for attachment to a transverse carriage of a coordinate table of a turret punch, and a clamp fixed to said holder for holding a workpiece and an electrical switch with contact means for a drive mechanism of the punch, said clamp being displaceable in relation to said holder and said switch being positioned in relation to said clamp so as to be disconnected if the clamp meets with unintentional resistance to its motion.

(A-B)

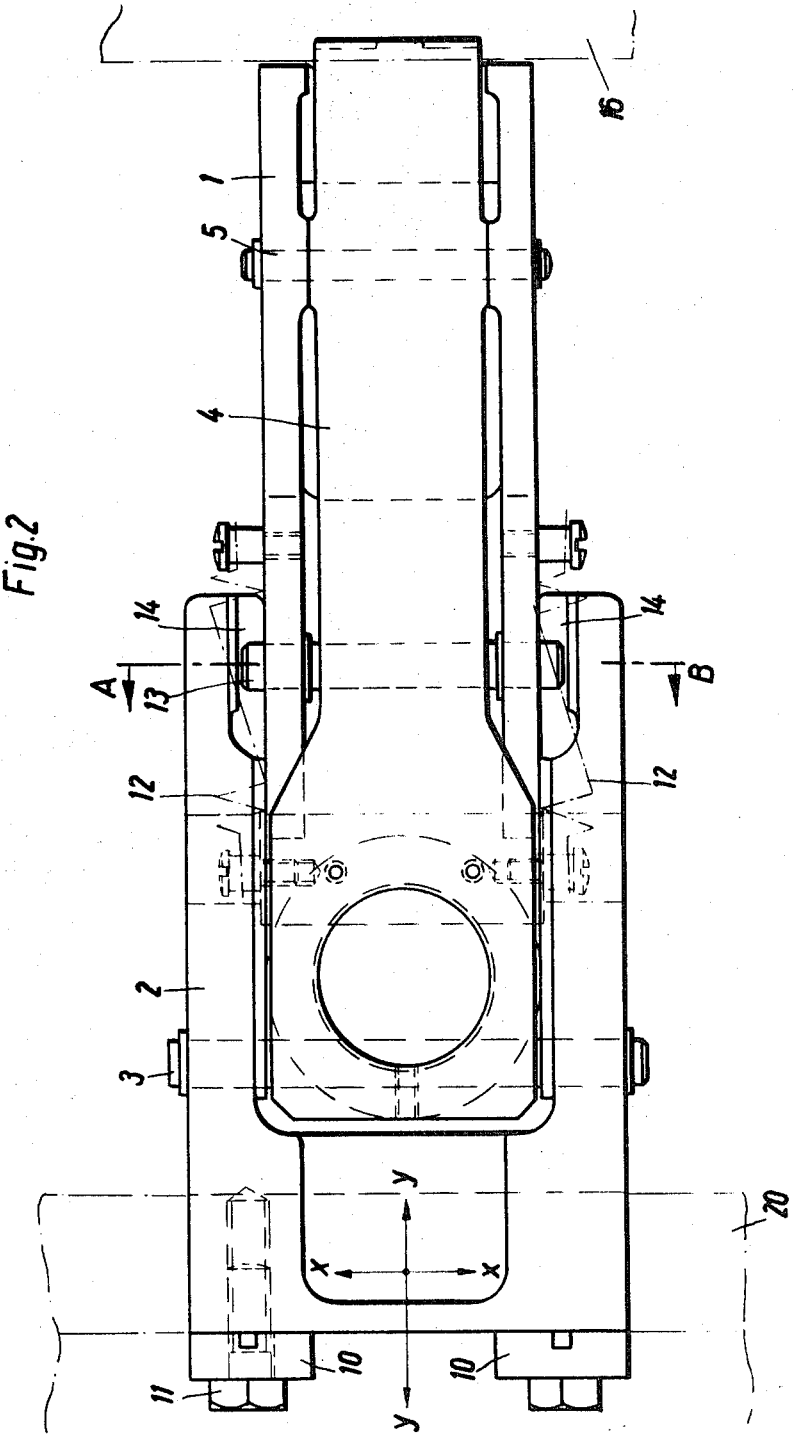

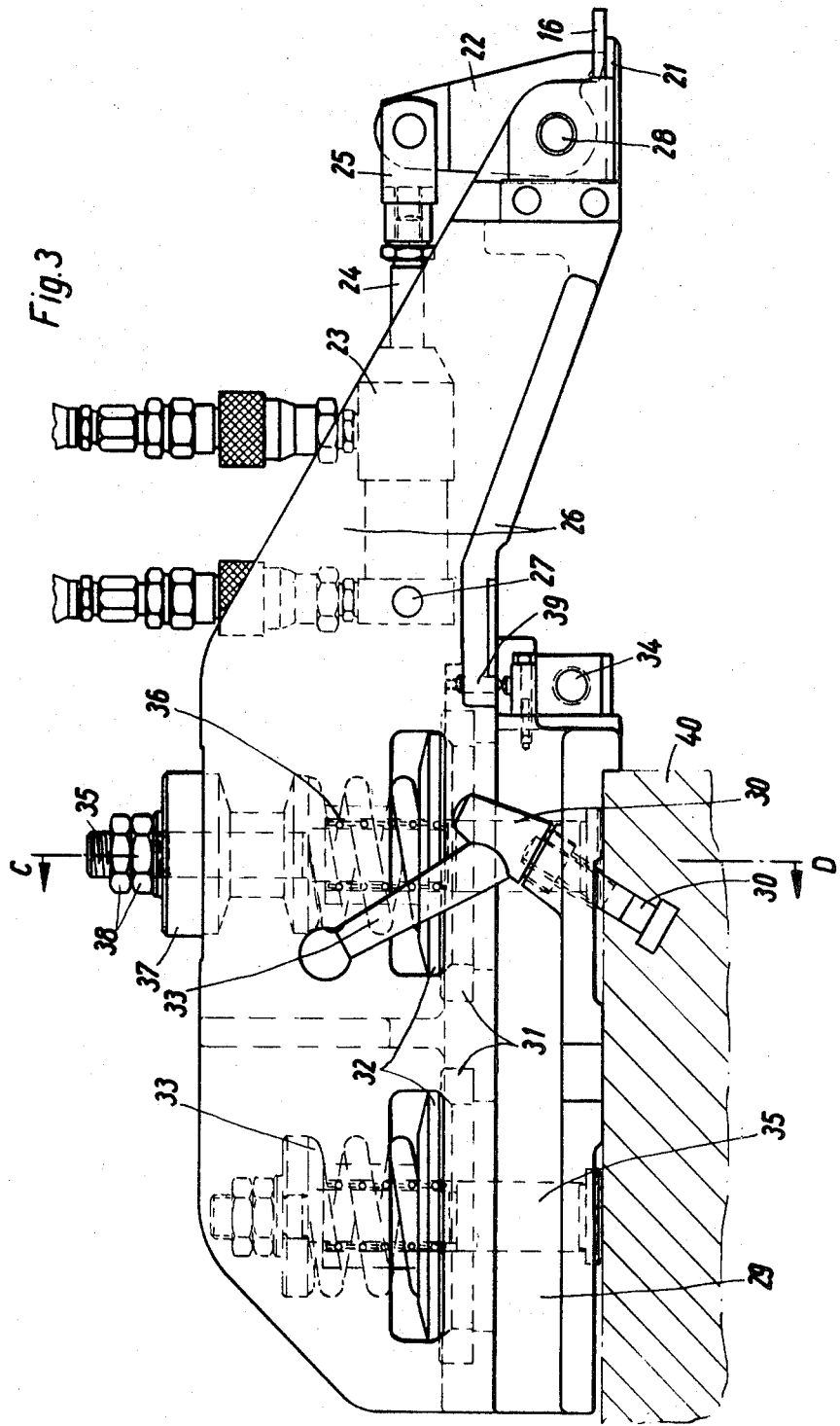

INVENTOR.
WALTER BREDOW 3,603,187

WORKPIECE CLAMPS FOR COORDINATE TABLES OF TURRET PUNCH

BACKGROUND OF THE INVENTION

The invention relates to a workpiece clamp for a manually operated or mechanically displaced or numerically controlled coordinate table of a turret punch, comprising a clamp holder displaceably attachable to the transverse carriage of the coordinate table and having a chuck lever or collet chuck pivotably or displaceably connected thereto. The chuck lever or collet chuck is manually, pneumatically or hydraulically actuated and holds a workpiece in the striking position for movement between an upper turret table rotatably mounted in the upper part of the machine or in the upper part of an inner tool holder and a lower turret table which is equiaxially mounted in the lower part of the machine or in the lower part of an inner tool holder. The turret tables are positionally coordinated with each other by a set of gears and can be brought into the working position. The task of the workpiece clamps is to hold the punching material (sheet) on the transverse carriage of the coordinate table, i.e., to clamp it rapidly thereto and to maintain it securely in the striking position. This problem is particularly acute in the case of numerically controlled coordinate tables, because in this case the machine operates according to a specific program, so that considerable damage may be caused to an expensive machine.

The object of the invention is to construct the workpiece clamp in such a manner, that said clamp or the movable parts connected therewith are capable of avoiding movement almost without dynamic reaction in case of any contact or collision, e.g., with the die, the die shoe or the lower revolver table on which die shoes with the die are mounted, and also if the punch fractures, while interrupting the punching movement or the movement of the coordinate table or both by operating electrical contacts.

SUMMARY OF THE INVENTION

Accordingly, the invention provides a device comprising (a) a clamp holder for attachment to a transverse carriage of a coordinate table of a turret punch and (b) a clamp fixed to said holder for holding a workpiece and (c) an electrical switch means for a drive mechanism of the punch, said clamp being displaceable in relation to said holder and said switch being positioned in relation to said clamp so as to be disconnected if the clamp meets with unintentional resistance to its motion. With such a construction, the drive of the machine is switched off when the clamp meets with even a slight resistance, so that disturbances and damage are avoided.

In one embodiment of the invention, a workpiece-arrester support in a transverse carriage holder is vertically pivotably mounted, so that on meeting with a resistance, the mechanical drive of the punching press is switched off by means of an arrester lever contained therein in the course of the pivotal movement through electrical switches linked with the transverse-carriage holder. In another embodiment, a workpiece clamp, with a workpiece-arrester support and an eccentric chuck lever, is displaceably arranged between a support plate and a bridge, so that first of all the normal position of the clamp relative to the support plate is maintained by means of cone wheel pairs which are pressed together centrally under the action of springs, an avoiding movement of the workpiece clamp occurring only when the clamp is subjected to a shock in any direction, whereby an electrical switch located on the support plate switches off the drive of the coordinate table. In a third embodiment, the workpiece-arrester support in the workpiece holder is vertically swingably mounted above the bolt, which, via the chuck lever mounted therein, disconnects the coupling for the ram movement of the press through an electrical switch connected with the workpiece holder, while the workpiece holder, which in its normal position, is held centered by the cone-wheel pairs acted upon by the springs, is displaced against the action of said cone wheel pairs, during which movement the electrical switch connected with the support plate disconnects the drive of the coordinate table. Thus, in this form of embodiment, double safety is provided, for use in particularly expensive machines, because first the coupling of the ram movement and secondly the drive of the coordinate table are switched off.

The accompanying drawings illustrate by way of example three embodiments of the invention. The third embodiment is a combination of the first two embodiments.

BRIEF DESCRIPTION OF THE DRAWINGS

FIG. 2 is a top view of the workpiece clamp illustrated in FIGS. 1a–1c;

FIG. 3 shows the side elevation of a second embodiment of the workpiece clamp according to the invention;

DETAILED DESCRIPTION OF THE DRAWINGS

Figure 1A:
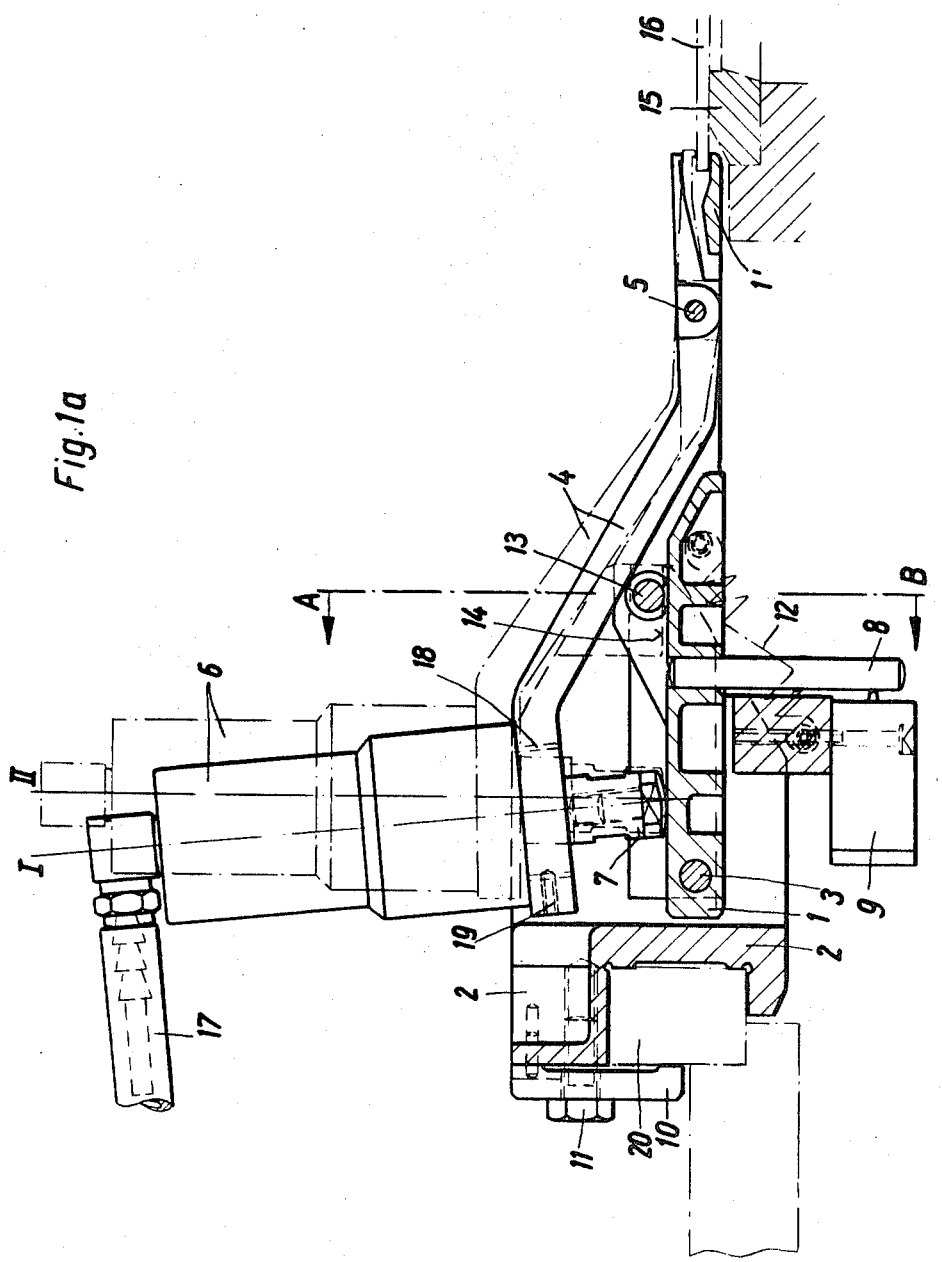
FIG. 1a shows a side elevation of the first embodiment of the workpiece clamp according to the invention in two positions: the workpiece not being clamped in position I, and the workpiece being clamped in position II.
Figure 1B:
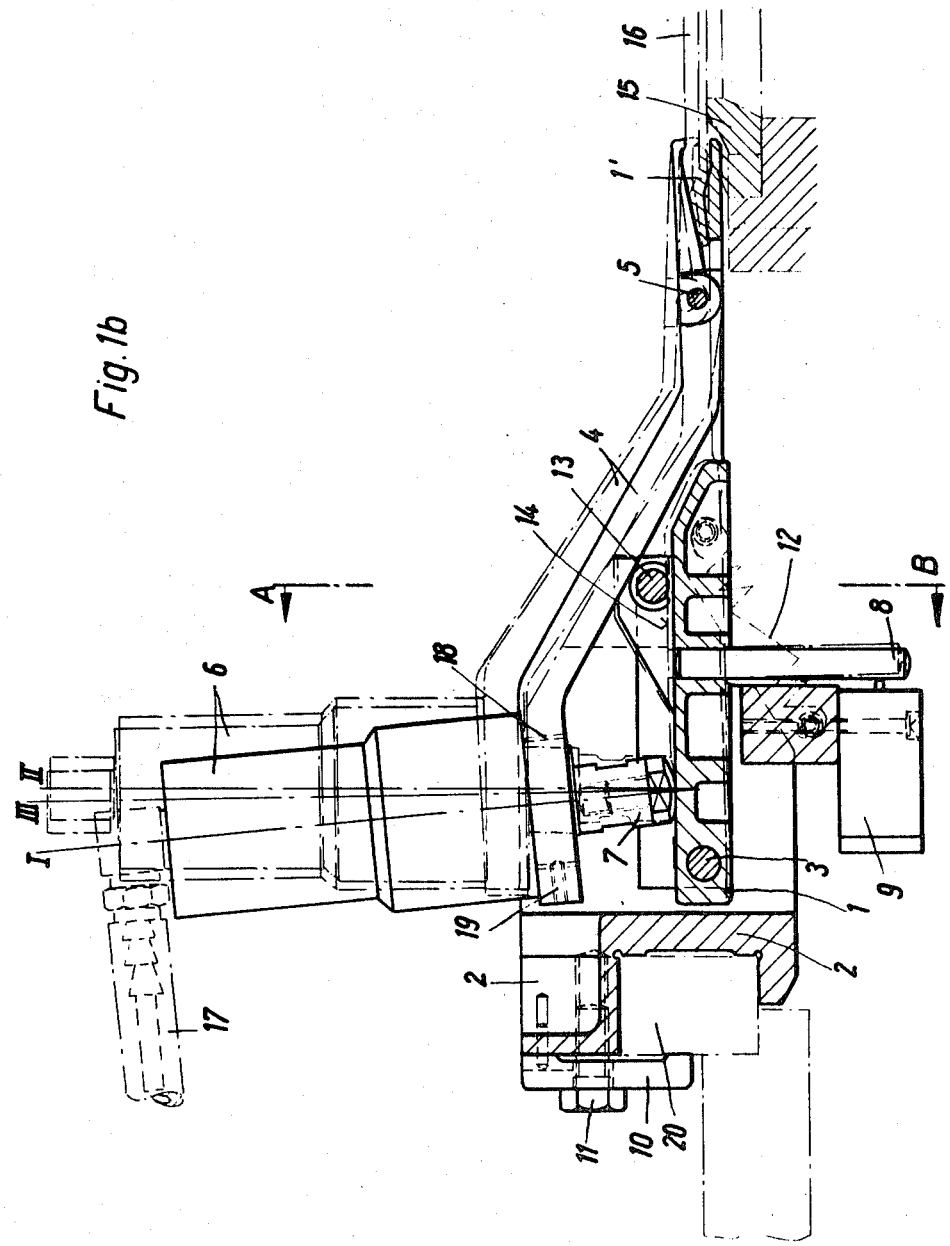
FIG. 1b shows a side elevation of the workpiece clamp in raised position III (circuit interrupted)
Figure 1C:
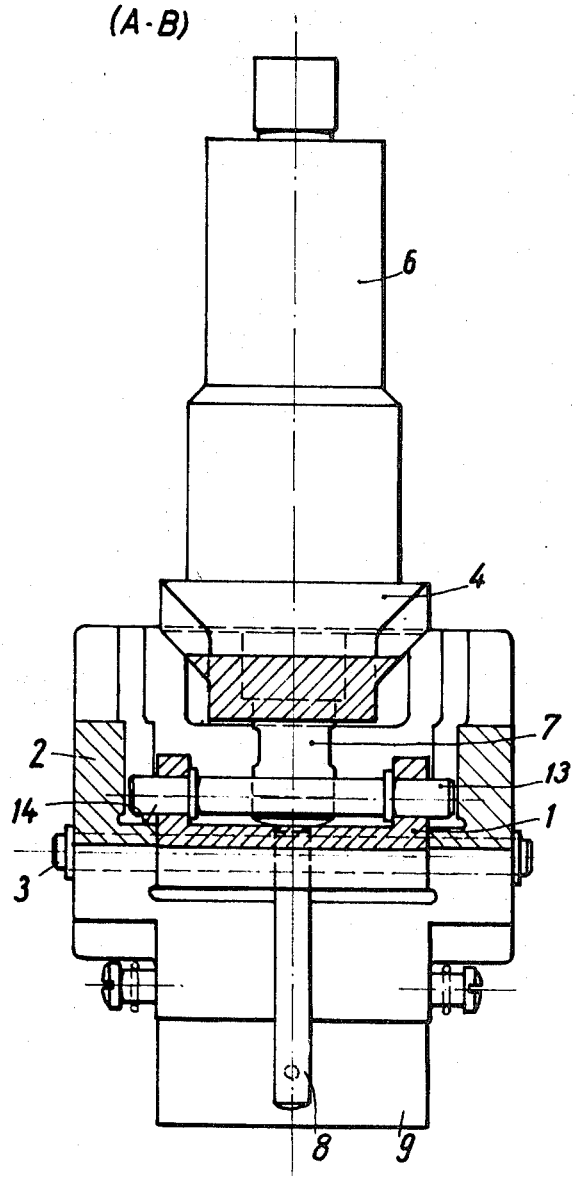
FIG. 1c is a section through the workpiece clamp in side elevation in position II in accordance with section A/B in FIGS. 1a and 1b.

FIGS. 1a and 1b show the first embodiment of the workpiece clamp according to the invention in two positions, I and II. In position I as shown in full lines, a workpiece is not clamped and in position II shown in chain-dotted lines, a workpiece is clamped. The device can be considered in three main units: (i) a fork-shaped holder 2 mounted on transverse carriage 20 of a coordinate table by means of clamping collar 10 and screw 11; (ii) a workpiece support 1 pivoted at bolt 3 between the limbs of the fork-shaped holder 2, having at its other end a bearing support 1'; and (iii) a clamping lever 4 pivoted at bolt 5 in the workpiece support 1 so as to be able to clamp a workpiece 16 at bearing support 1'.

Fork-shaped holder 2 is capable of movement in the y or x directions according to the movement of the transverse carriage 20.

Workpiece support 1 is held by springs 12 between holder 2 and support 1 so that in normal conditions arrester bolt 13 on the support abuts on bearing surfaces 14 on the holder 2. In this position arrester bolt 8 holds switch 9 closed so that the power circuit to the punch (not shown) is operative.

Clamping lever 4 is operated by hydraulic cylinder 6 with piston rod 7 fed through flexible tube 17. Cylinder 6 is fixed to lever 4 by a threaded connection 18 and locking pin 19 and can therefore readily take up positions I, II or III, as described in more detail below.

The operation of the device will now be described in conjunction with a die 15 having a bevelled edge surface. Normally, the workpiece 16 is placed over and in contact with the upper surface of the die. If the workpiece is wrongly positioned, the support 1' is displaced upwards, e.g., by the bevelled surface (or alternatively, by some other similar accidental collision). Since workpiece support 1 then pivots about bolt 3, arrester bolt 8 is displaced and switch 9 is opened thus interrupting the drive to the punch.

However, the movement of the coordinate table is not interrupted, so that the workpiece-support 1 glides in the raised position over the die which is in the punching position and also over the die which is in the punching position and also over any dies located in front or behind this die. If the workpiece-support 1 is returned to the normal position between two adjacent dies by the springs 12, then the power circuit of the punch is again closed, but the machine will not punch, since when the machine is under numerical control, the punching instruction operates only when the tool and the workpiece are in the working position.

FIGS. 3-6 show the second embodiment of the invention. The workpiece 16 is clamped against a support 21 of a workpiece clamp 26 by a lever 22, which is operated by a double-acting hydraulic cylinder 23, piston rod 24 and coupling fork 25. The lever 22 and the hydraulic cylinder 23 are pivoted in the workpiece clamp 26 on bolts 27 and 28, respectively.

The workpiece clamp 26 (FIG. 6) bears with its lower face on a support plate 29 and is slidable or pivotable between this plate 29 and a bridge 37. To allow movements of the clamp 26, this arrangement is adjustable by means of nuts 38 on bolt 35. The support plate 29 is slidably fastened to a transverse carriage 40 of the coordinate table by means of tommy screws 30.

FIG. 3 shows a switch arrangement for interrupting the power circuit of the drive of the coordinate table. A contact pin 39 is firmly seated in the workpiece clamp 26. In the normal position, this contact pin 39 is depressed, so that the power circuit is closed. If the workpiece clamp 26 is displaced or pivoted relative to the plate 29, the pin of switch 34 snaps upwards and interrupts the circuit.

To allow the displacement and/or pivoting of the clamp 26, it is resiliently held in its normal position. This is effected by means of the upper cone plate 32 acted upon by spring 33, which plate is axially displaceable on bolt 35 by means of ball bearings 36. The cone plate 32 is supported on conical ring 31 in the clamp 26 to locate the clamp in its normal position, so that the clamped workpiece 16 is held in the required X-Y positions.

The embodiment shown in FIGS. 3 to 6 useful if workpiece clamp 26 should collide with the die shoe or the edge of the turntable, and also if punch fracture occurs. In such case a horizontal pivotal or sliding motion of the clamp 26 is produced, so that the drive of the coordinate table must be disconnected to avoid breakage. On collision of the clamp 26 with the die shoe or the turntable (or in any further colliding motion of the transverse carriage) the clamp is displaced against the action of the spring-loaded cone plate/cone ring combination. When this happens, the drive of the coordinate table will be switched off by switch 34 and pin 39 as described above.

Even the disconnection of the table drive, the kinetic energy of the transverse and longitudinal carriages may result in a secondary movement, especially with large and heavy coordinate tables. This movement displaces relative to each other the support plate 29 (coupled with the transverse carriage 40) and the workpiece clamp (with the workpiece held therein). During this movement, the clamp 26 with the conical ring 31 held therein can slide bodily under the spring-loaded cone plate 32, up to an extent where the inside of the ring 31 hits bolt 35.

The displacement would reach a maximum, for example when a punch fractures and the table movement is electrically switched off, while the workpiece is blocked against all movement by the broken-off punch stumps held therein and in the die.

If, exceptionally, the distance between the cone ring 31 and the bolt 35 is insufficient, then the hardened bolt 35 should preferably be of a material or structure capable of breaking off at a predetermined fracture point, whereby the workpiece clamp is protected against any further damage in this exceptional case as well.

Figure 4:
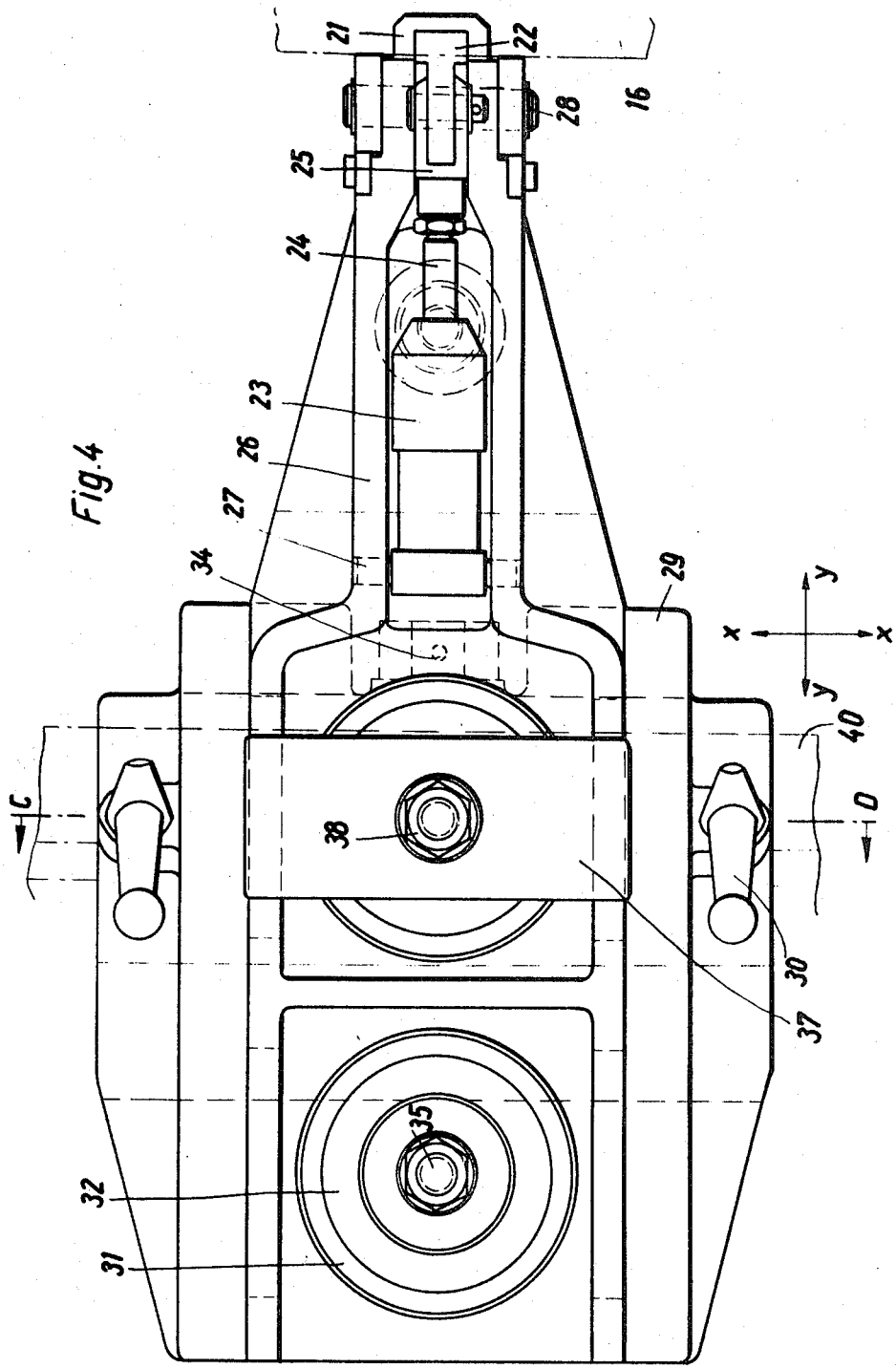
FIG. 4 is a top view of the workpiece clamp according to FIG. 3 (e.g., with a collet chuck)
Figure 5:
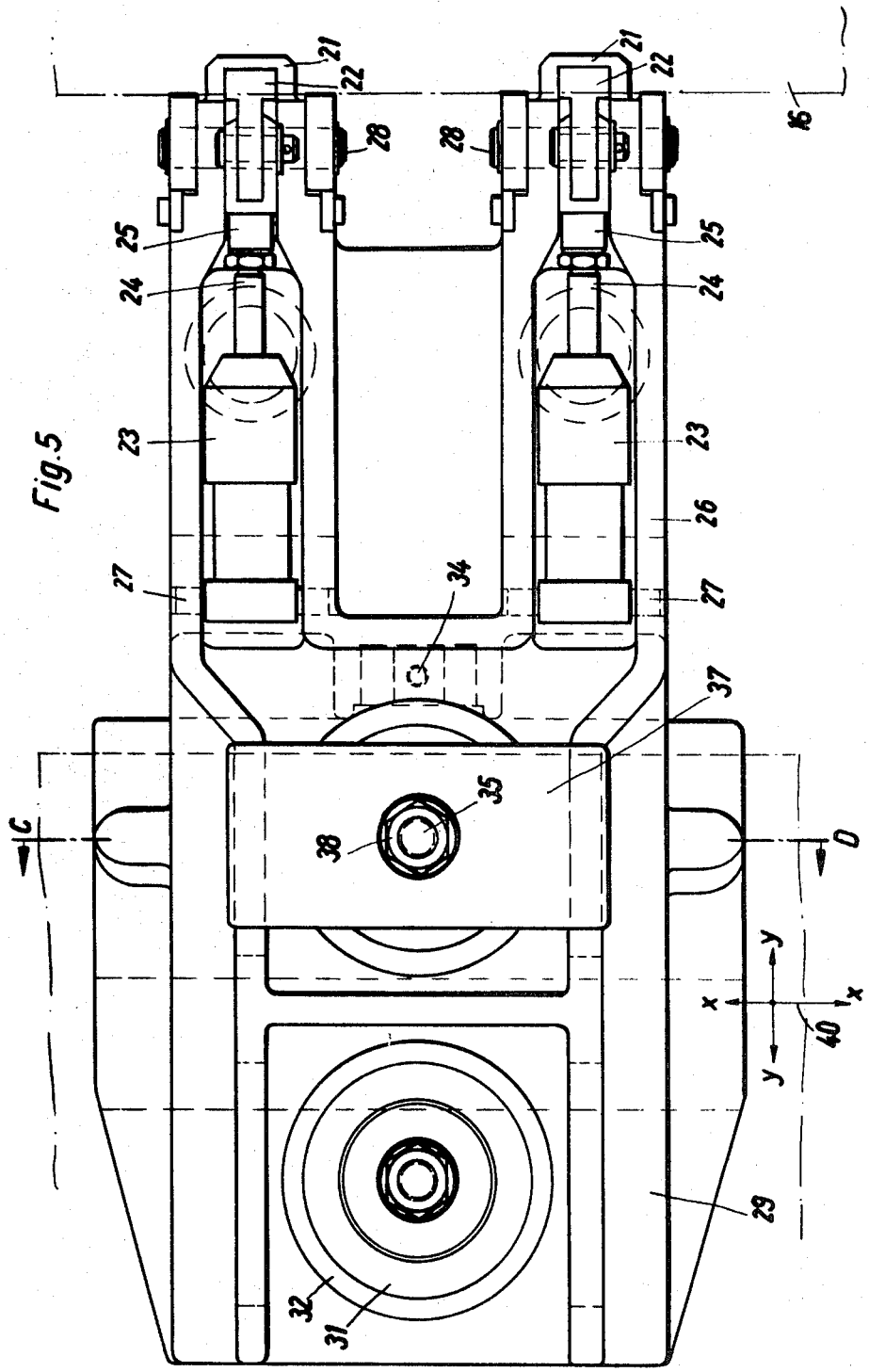
FIG. 5 is the top view of the workpiece clamp (e.g., with two collet chucks)
Figure 6:
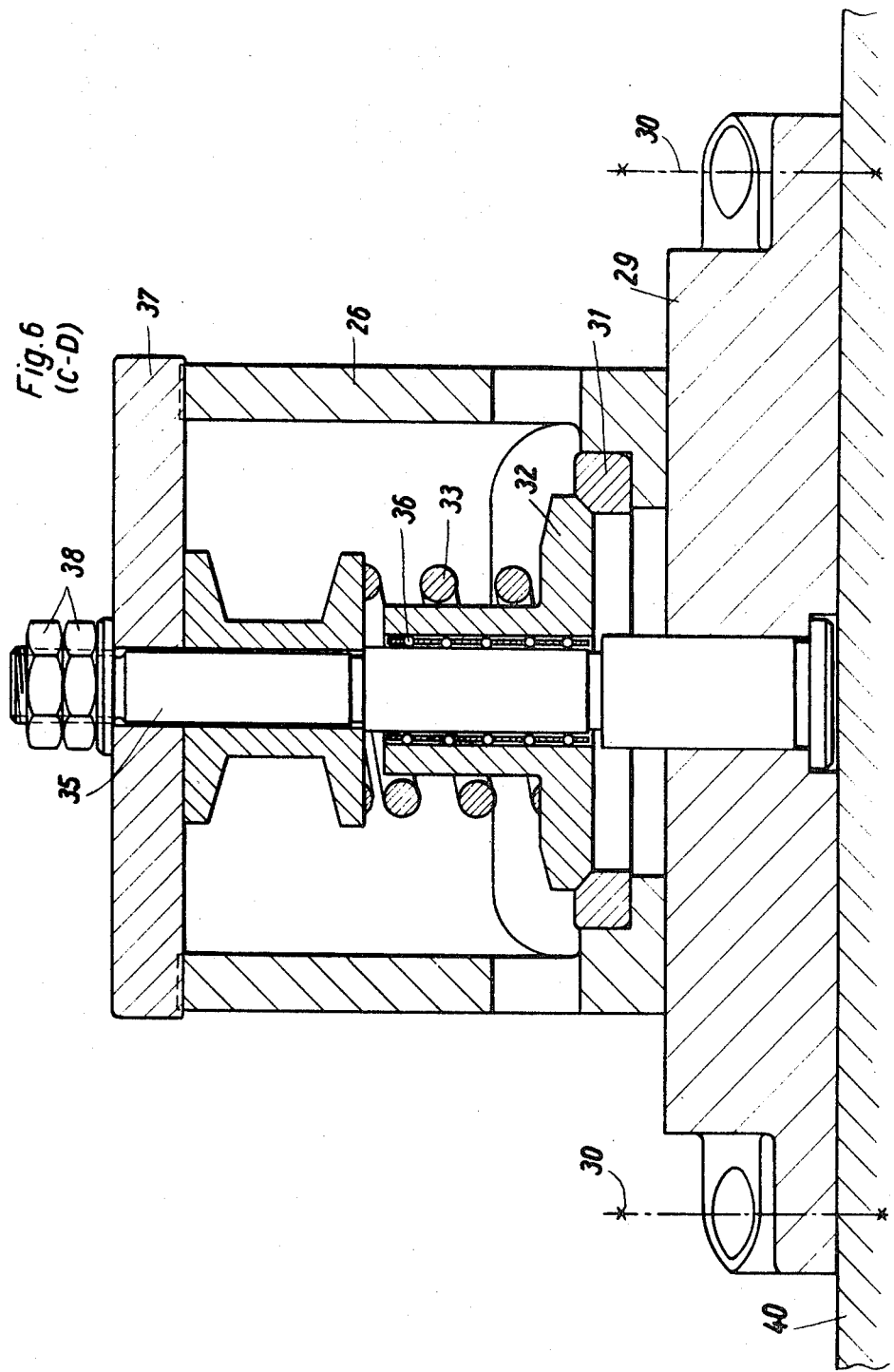
FIG. 6 shows a section through the arrangement of the spring suspension of the cone wheels in the workpiece clamp according to section C–D in FIGS. 3–5.

FIG. 5 shows a variant of the embodiment shown in FIG. 4, this variant having two collet chucks 26. This enables the sheet 16 to be clamped at two points, thus improving the safety operation of the workpiece clamp. In other respects the individual parts of the two collet chucks correspond with those of the collet chuck of FIG. 4 and the same reference numerals are employed.

Figure 7:
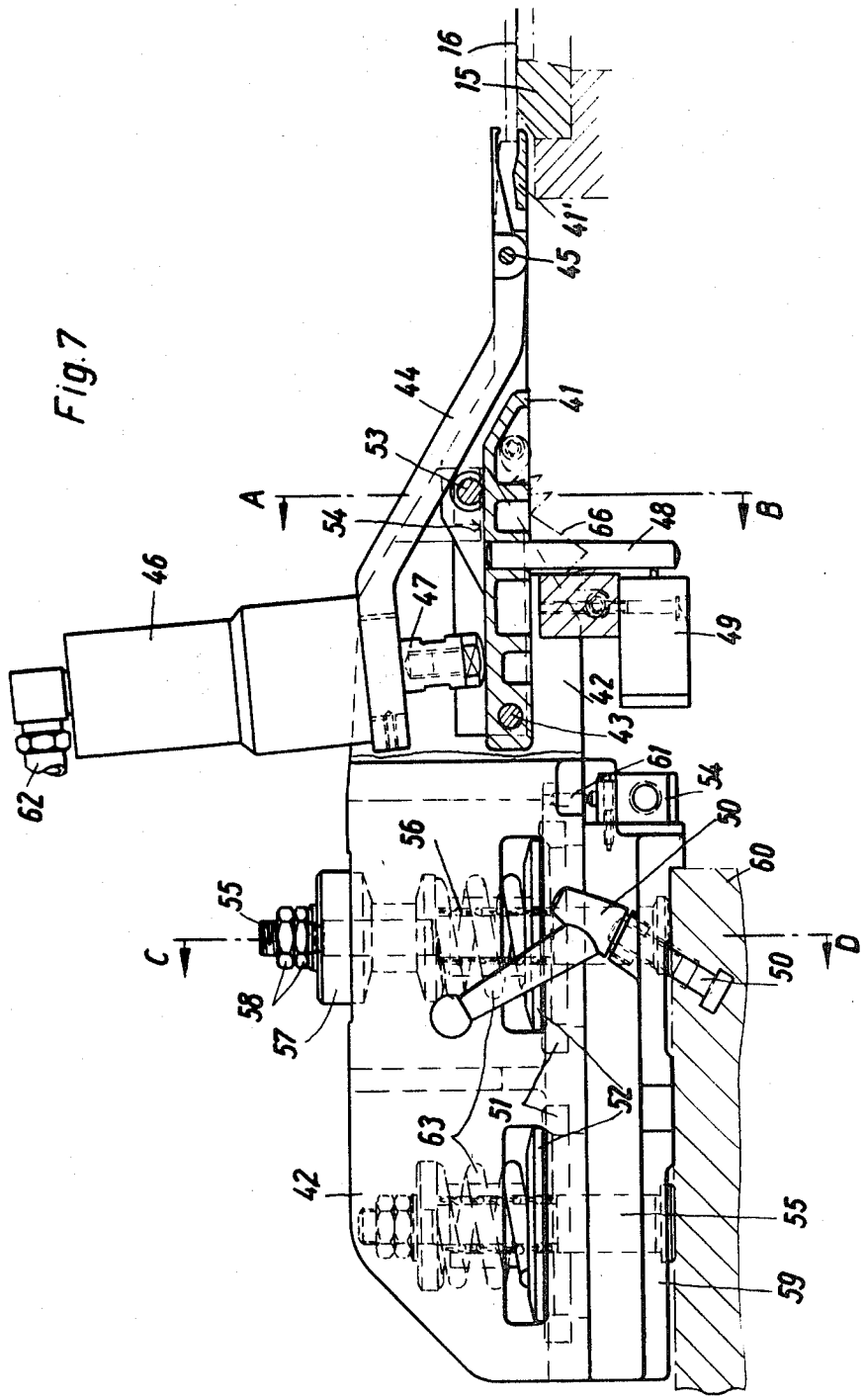
FIG. 7 shows the side elevation of a third embodiment of the workpiece clamp according to the invention, partly in section.
Figure 8:
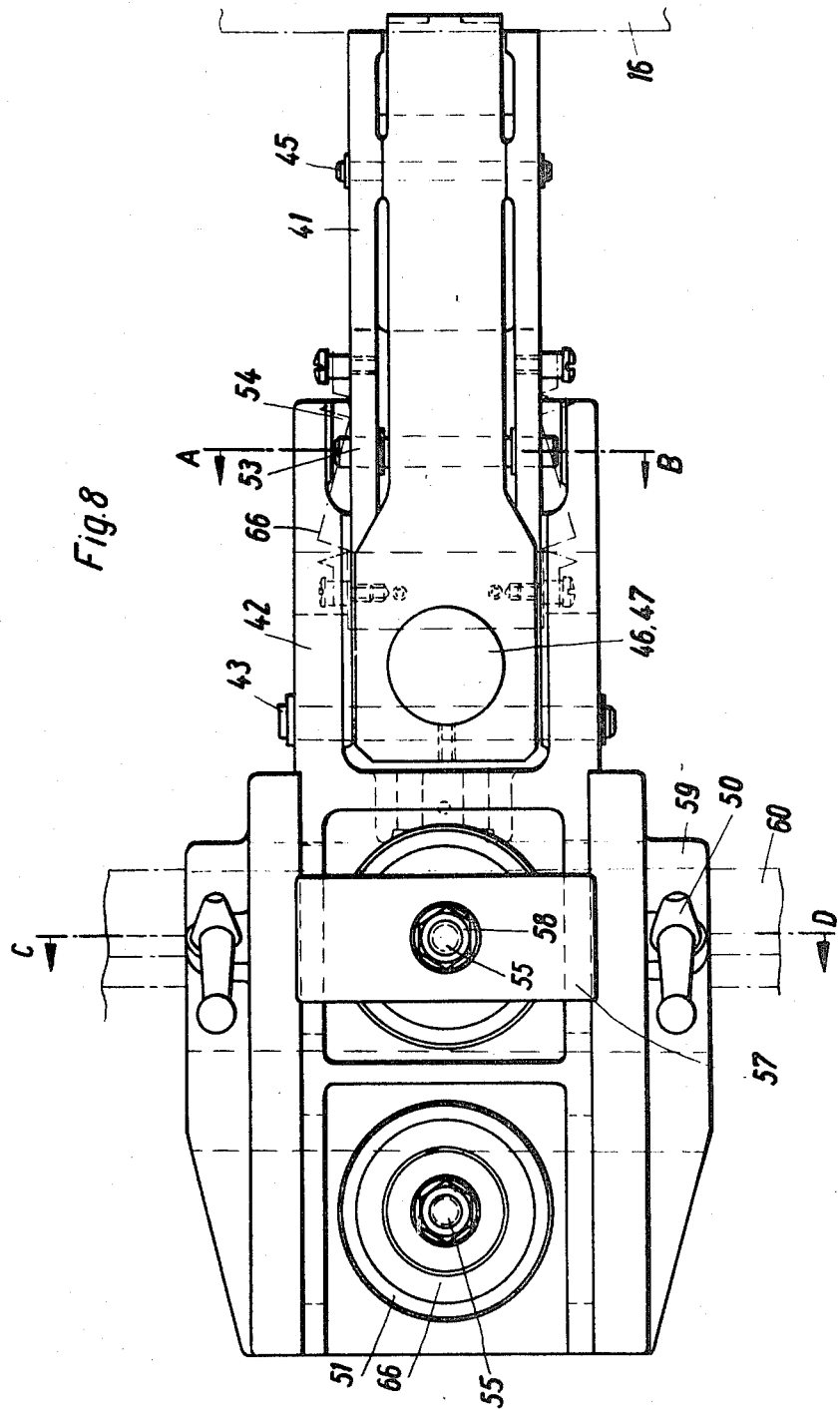
FIG. 8 is the top view of the workpiece clamp according to FIG. 7.
Figure 9:
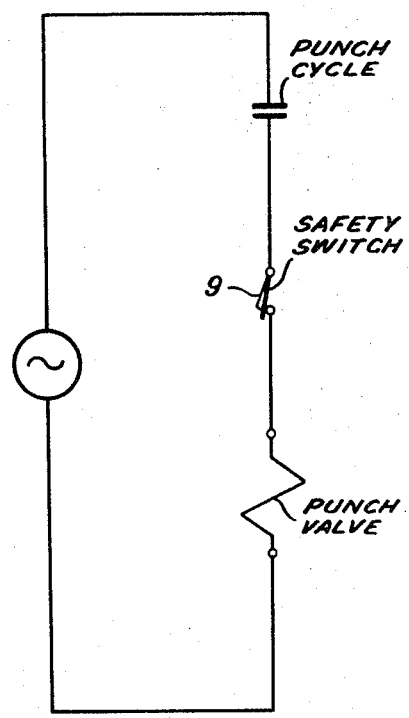
FIG. 9 is a circuit diagram showing the control circuit for the punch.
Figure 10:
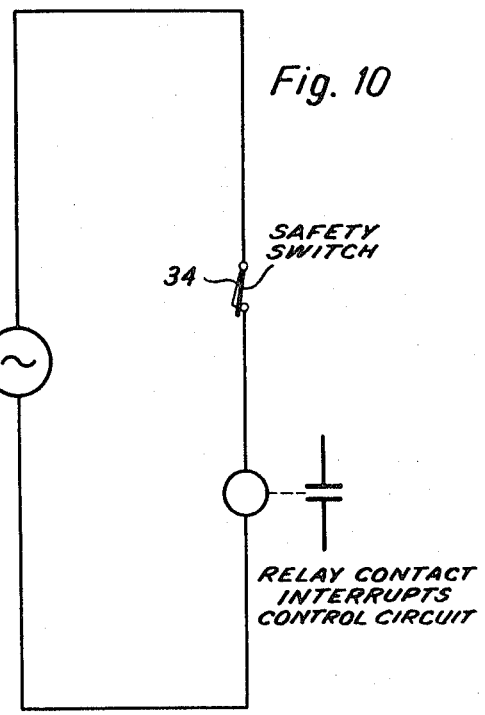
FIG. 10 is a circuit diagram showing and arrangement for interrupting the drive of the coordinate table.
Figure 11:
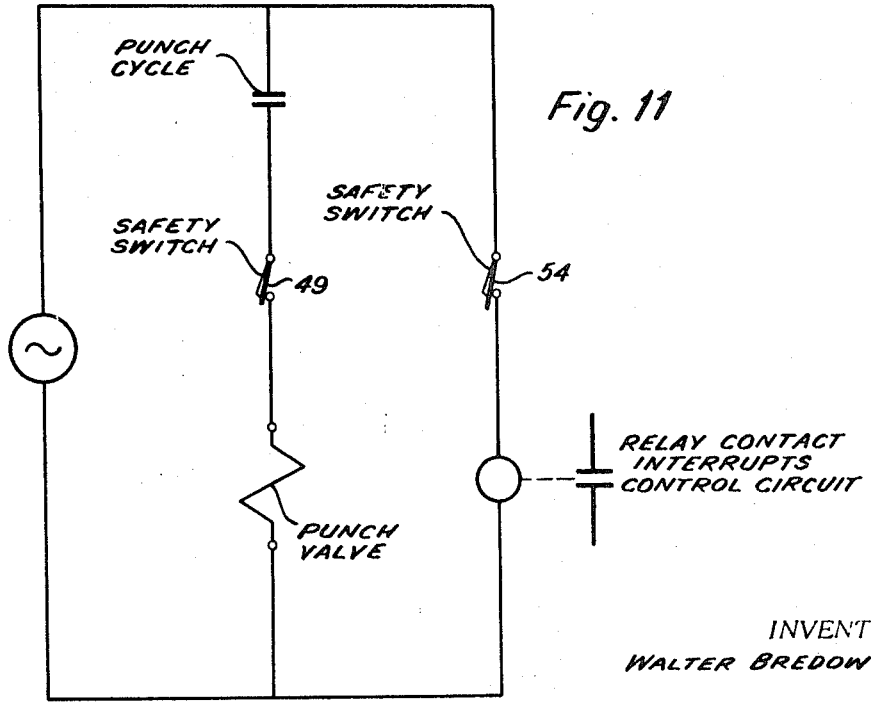
FIG. 11 is the control circuit for the embodiment of FIGS. 7 and 8.
Figure 12:
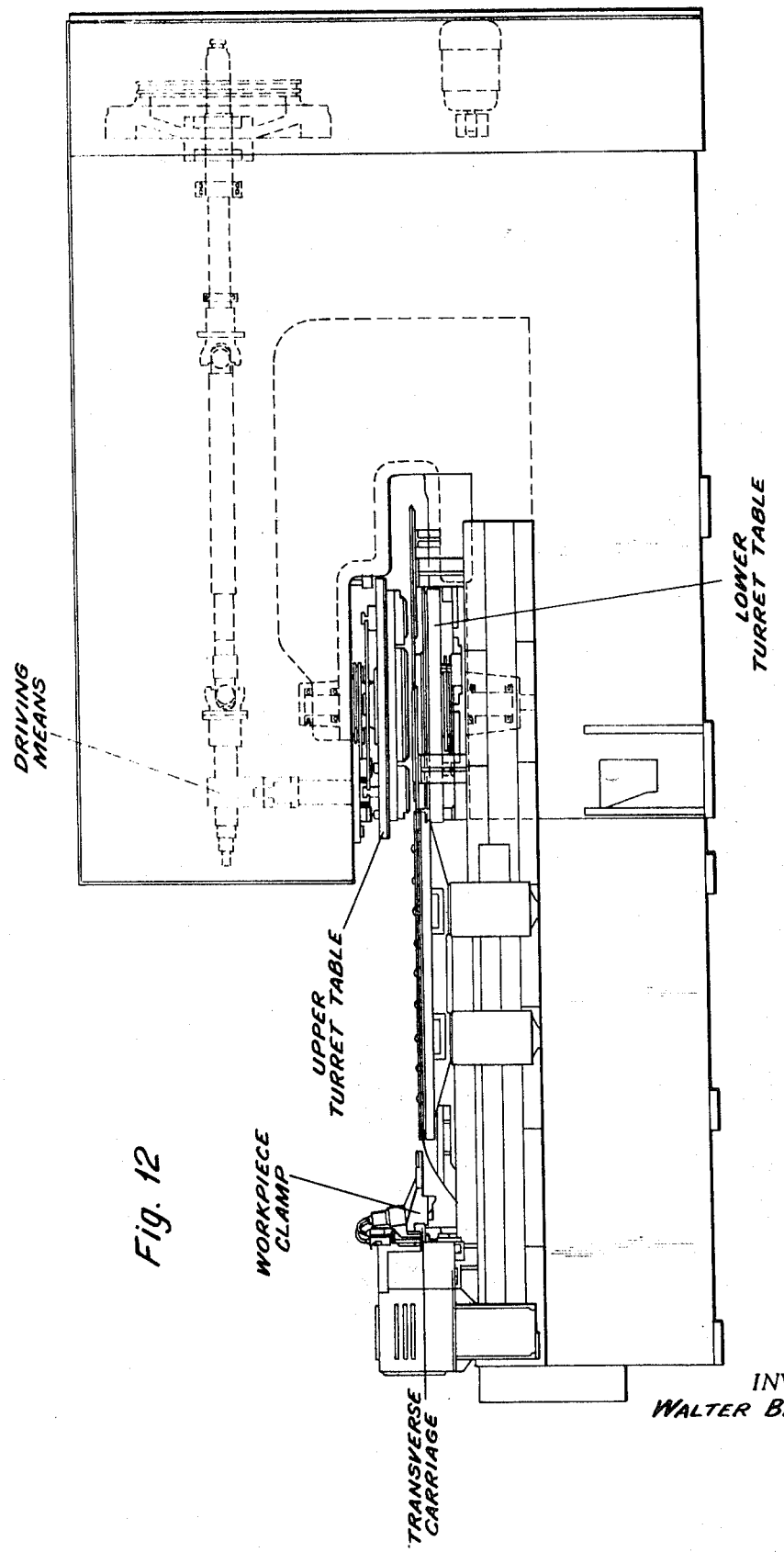
FIG. 12 shows a side elevation of the punching machine incorporating the present invention.

FIG. 7 and 8 illustrate the third embodiment of the workpiece clamp. This embodiment is a combination of the two foregoing examples described with reference to FIGS. 1 and 2 and FIGS. 3-6, and therefore has the advantage of a double safety system.

The workpiece clamp, that is a collet chuck and a workpiece support 41', is pivoted in the holder 42 about bolt 43. Chuck lever 44 is pivoted in the holder 42 about bolt 45. The chuck lever 44 is moved into the clamping position by the hydraulic cylinder 46, whose piston rod 47 bears against the support 41. The hydraulic cylinder is attached to the chuck lever 44 by a threaded attachment and secured by a threaded pin 65. Consequently, the chuck lever 44 and the hydraulic cylinder 46 will execute the same pivotal movements when the hydraulic cylinder 46 is operated, and move into the same positions I, II and III illustrated in FIGS. 1a–1c. The hydraulic cylinder is actuated by a pressure medium fed to it through the flexible tubing 62.

The workpiece clamp 42 rests with its lower face on a support plate 59 and is slidable or pivotable between said support plate and a bridge 57 shown in side elevation in FIG. 7 and in top view in FIG. 8. This bridge is adjustable for play by nuts 58 over the bolts 55.

A support plate 59 is slidably fastened to a transverse carriage 60 of a coordinate table by tommy screws 50. Switch 54 on the plate 59 interrupts the drive of the coordinate table or of its transverse carriage 60 in case of a pivotal or sliding movement of the clamp 42 in cooperation with pin 61.

The upper conical plates subject to the action of springs 63, which plates are axially displaceable by means of ball bearings 56 on bolts 55, ensure in conjunction with the conical rings 51 in the clamp 42 that the normal position is maintained, thus securing workpiece 16 in the X-Y positions.

In this embodiment, the workpiece clamp is so constructed that in the case of an accidental ascent of the support 41' on the bevelled portion of the die 15 the workpiece support 41 is raised and the arrester bolt 48 connected therewith is pivoted downwards by the pivotal movement of the support 41 in the direction of the die 15, so that the contact between this bolt 48 and the cam switch 49 and thereby the power circuit of the ram coupling is cut. The movement of the coordinate table 60 will not be interrupted so that the workpiece support 41 is lifted above and glides over the die which is in the punching position and also over the die located in front or to the rear of the latter. If owing to the action of the traction springs 66, the workpiece support 41 is pivoted back into the normal position between two adjacent dies, then the power circuit of the punch coupling will be restored, but in the case of a numerical control the machine will not punch, because the punching instruction will appear only if a tool and the workpiece are both in the punching position.

However, if the workpiece clamp 41 accidentally collides with the die shoe or with the turntable or a punch fractures blocking any movement of the workpiece by the punch fragments located therein and in the die, a horizontal pivotal or sliding movement of the clamp 42 occurs, during which the contact between the contact pin 61 held therein and the switch 54 is cut and thus the power circuit of the drive of the coordinate table 60 is switched off.

I claim:

1. A device comprising (a) a clamp holder for attachment to a transverse carriage of a coordinate table of a turret punch and (b) a clamp pivotally arranged relative to said holder for holding a workpiece and (c) an electrical switch means for a drive mechanism of the punch, said clamp being displaceable at least heightwise in relation to said holder and said switch being positioned in relation to said clamp so as to be disconnected if the clamp meets with unintentional resistance to its motion.

2. A device comprising a clamp holder for attachment to a transverse carriage of a coordinate table of a turret punch; a clamp fixed to said holder for holding a workpiece and an electrical switch means for a drive mechanism of the punch, said clamp being displaceable in relation to said holder and said switch means being positioned in relation to said clamp so as to be disconnected if the clamp meets with an unintentional resistance to its motion, the clamp being pivoted on the holder and the switch means being positioned so that when the clamp meets with an unintentional resistance to its motion it can pivot on the holder thereby disconnecting the switch means, the switch means being for the drive mechanism of the punching press of the punch.

3. A device comprising a clamp holder for attachment to a transverse carriage of a coordinate table of a turret punch, a clamp fixed to said holder for holding a workpiece, drive mechanisms for the punch and coordinate table, electrical switch means for the drive mechanisms, the clamp being pivoted on the holder and being also capable of movement relative to the holder in a plane parallel to the axis of the pivot so that when the clamp meets with an unintentional resistance to its motion it can move relative to the holder in a plane parallel to the axis of the pivot thereby disconnecting the switch means for the drive mechanism of the coordinate table.

4. A device as claimed in claim 1, including electrical switch means for a drive mechanism for the coordinate table, the clamp being pivoted on the holder and being also capable of movement relative to the holder in a plane parallel to the axis of the pivot so that when the clamp meets with an abnormal or improper resistance to its motion it can pivot on the holder thereby disconnecting one of said electrical switch means.

5. A workpiece clamp for a coordinate table on a turret punch comprising a clamp holder displaceably attached to a transverse carriage of a coordinate table having a chuck lever adjustably attached, which holds the workpiece in a position for movement between an upper turret table rotatably mounted in the upper part of the machine or in the upper part of an inner tool holder and a lower turret table which is equiaxially mounted in the lower part of the machine or in the lower part of an inner tool holder, wherein workpiece clamps are pivotally arranged so that, on collision with a stationary part they execute an avoiding movement, whereby an electrical contact located in the region of said avoiding movement is actuated thereby interrupting or disconnecting a drive mechanism.

6. A workpiece clamp as claimed in claim 5, wherein a workpiece bearing support in a transverse-carriage holder is mounted for vertical pivotal movement about a bolt and switches off a mechanical drive of the punching press by means of an arrester lever in the course of its pivotal movement via an electric switch connected with the transverse-carriage holder.

7. A workpiece clamp as claimed in claim 5, wherein the workpiece clamp having a workpiece bearing support and an eccentric chuck lever is slidable between a support plate and a bridge, the normal position of the clamp relative to the support plate being maintained by pairs of conical plates which can be pressed together with centering effect under the action of springs and which, in the case of a shocklike stress on the workpiece clamp allow a sliding movement of the latter, whereby an electric switch located on the support plate switches off a drive of the coordinate table.

8. A workpiece clamp as claimed in claim 5 wherein the workpiece-bearing support is vertically pivotably mounted in the workpiece holder via a bolt and by the chuck lever located therein disconnects in the course of its pivotal movement through an electric switch connected with the holder, the coupling of the punch movement of the punching press, and, in addition, the workpiece holder, which in its normal position is maintained with centering effect by the conical plate pairs acted on by springs, is displaceable against the action of said spring-loaded pairs of conical plates, during which movement the electric switch connected with the support plate switches off a drive of the coordinate table.